US011731339B2

(12) United States Patent
Weibler

(10) Patent No.: US 11,731,339 B2
(45) Date of Patent: Aug. 22, 2023

(54) TILTING MEASUREMENT OF A THERMOFORMING MOULD

(71) Applicant: Marbach Werkzeugbau GmbH, Heilbronn (DE)

(72) Inventor: Klaus Weibler, Bretzfeld-Bitzfeld (DE)

(73) Assignee: Marbach Werkzeugbau GmbH, Heilbronn (DE)

( * ) Notice: Subject to any disclaimer, the term of this patent is extended or adjusted under 35 U.S.C. 154(b) by 66 days.

(21) Appl. No.: 17/257,357

(22) PCT Filed: Jul. 5, 2019

(86) PCT No.: PCT/EP2019/068060
§ 371 (c)(1),
(2) Date: Dec. 31, 2020

(87) PCT Pub. No.: WO2020/016024
PCT Pub. Date: Jan. 23, 2020

(65) Prior Publication Data
US 2021/0402672 A1    Dec. 30, 2021

(30) Foreign Application Priority Data

Jul. 18, 2018   (DE) ..................... 10 2018 117 328.8

(51) Int. Cl.
*B29C 51/46*   (2006.01)
*B29C 51/08*   (2006.01)
(Continued)

(52) U.S. Cl.
CPC ............ *B29C 51/46* (2013.01); *B29C 51/082* (2013.01); *B29C 51/30* (2013.01); *B29L 2031/7132* (2013.01)

(58) Field of Classification Search
CPC ....... B29C 33/303; B29C 51/46; B29C 51/30; B29C 51/082; B29L 2031/7132
See application file for complete search history.

(56) References Cited

U.S. PATENT DOCUMENTS 4,648,823 A    3/1987   Yashima
6,627,278 B1 * 9/2003   Sandstrom ............. B65D 1/265
                                                    524/157
(Continued)

FOREIGN PATENT DOCUMENTS

DE    102016103237 A1   8/2017
EP       2586590 A1    5/2013
(Continued)

OTHER PUBLICATIONS

Office Action dated Feb. 16, 2022, issued by the China National Intellectual Property Administration in Chinese patent application No. 201980047766.6.
(Continued)

*Primary Examiner* — Monica A Huson
(74) *Attorney, Agent, or Firm* — Riley Intellectual Property Law, LLC; Thomas P. Riley

(57) ABSTRACT

A thermoforming mould for producing cup-shaped articles from a heated film of plastic is provided. The thermoforming mould comprises a first mould part and a second mould part which are movable in relation to one another, wherein at least one cavity for moulding a cup-shaped article is formed in one of the two mould parts. The thermoforming mould also comprises a measuring device which is designed to determine a tilting of the first mould part and the second mould part with respect to one another. Furthermore, a thermoforming machine comprising the thermoforming mould and also a method for determining a tilting between a first mould part and a second mould part of a thermoforming mould are provided.

8 Claims, 5 Drawing Sheets

(51) Int. Cl.
*B29C 51/30* (2006.01)
*B29L 31/00* (2006.01)

(56) References Cited

U.S. PATENT DOCUMENTS

| | | |
|---|---|---|
| 6,821,461 B1 | 11/2004 | Bessiere et al. |
| 7,753,668 B2 | 7/2010 | Glaesener et al. |
| 9,243,894 B2 | 1/2016 | Yamauchi |
| 2001/0053395 A1 | 12/2001 | Hosoe |
| 2007/0218157 A1 | 9/2007 | Tsai |
| 2012/0127485 A1 | 5/2012 | Yamauchi |
| 2014/0197561 A1* | 7/2014 | Pirog .................. B29C 33/303 425/150 |

FOREIGN PATENT DOCUMENTS

| | | |
|---|---|---|
| EP | 3308944 A1 | 4/2018 |
| FR | 2794055 A1 | 12/2000 |
| WO | 2012174657 A1 | 12/2012 |

OTHER PUBLICATIONS

Office Action dated May 18, 2022 in European patent application No. 19 737 074.5.
Office Action dated Apr. 26, 2019 in priority patent application DE 10 2018 117 328.8 (With English translation of page 4).
International Search Report from PCT/EP2019/068060 (English translation from WIPO).
International Preliminary Report on Patentability PCT/SA/237 from PCT/EP2019/068060 (with English translation of Section V, pp. 4-6).

* cited by examiner

TILTING MEASUREMENT OF A THERMOFORMING MOULD

FIELD

The invention relates to thermoforming machines for producing cup-shaped articles from a heated film of plastic. Specifically described is a thermoforming mould for such a thermoforming machine.

BACKGROUND

Thermoforming moulds for producing cup-shaped articles from a heated film of plastic are sufficiently known. For example, see DE 10 2016 103 237 A1. The structure of such a thermoforming mould shall be explained in greater detail in connection with FIG. 1a. FIG. 1a is a sectional view of a thermoforming mould 100 for combined moulding and blanking for producing cup-like articles from a plastic film. The thermoforming mould 100 comprises an upper mould part 110 and a lower mould part 150, which can be moved in relation to one another.

The thermoforming mould 100 furthermore comprises at least one moulding device 160, received in the lower mould part 150, for shaping cup-shaped articles (or cups, for short), wherein each moulding device 160 comprises a mould insert 162 and a mould bottom 164, which together form a cavity 166. As an example, two moulding devices 160 arranged parallel to one another may be seen in FIG. 1a. The mould bottom 164 of each moulding device 160 is coupled to an ejection rod 172 and an ejection strip 174 of an ejection device 170 that is provided for ejecting the cup-shaped articles. The lower mould part 150 furthermore comprises a cooling block 152 that surrounds the at least one moulding device 160 and that is provided for cooling the cups moulded in the moulding device 160.

The thermoforming mould 100 has at least one recess 116 that is arranged in the upper mould part 110 coaxial to the moulding device 160 and embodied open to the lower mould part 150. Again as an example, two recesses 116 may be seen in FIG. 1a; these are arranged corresponding to the two moulding devices 160 of the lower mould part 150. Each recess 116 is provided for receiving a holder 130 having a cavity 132 open to the respective cavity 166 of the lower mould part 150. The thermoforming mould 100 furthermore comprises a pre-stretching device 120, a spacer strip 112, and a cutting plate 114. The pre-stretching device 120 comprises a pre-stretcher 126 provided for each cavity 132 and a pre-stretcher rod 124 and pre-stretcher plate 122 mechanically coupled to each pre-stretcher 126.

The pre-stretcher 126 is designed to press a plastic film (not shown in FIG. 1a) arranged between the upper mould part 110 and the lower mould part 150 (more precisely, between the cavity 132 and the cavity 166) into the cavity 166 in order in this manner to preform the plastic cup. To this end, once the mould has been closed, the pre-stretcher 126 is moved from a rest position shown in FIG. 1a, in which the pre-stretcher 126 is received inside the cavity 132 of the holder 130, into a stretching position, in which the pre-stretcher 126 is moved into the cavity 166. The pre-stretching plate 122 is used to control the movement of the prestretcher 126 between rest position and stretching position.

The spacer strip 112 is provided to bridge an installation space, provided fixed in the thermoforming machine in terms of height, if, for example, the upper mould part 110 is not as high as the installation space provided. A cutting edge 115 in the lower mould part 150 is provided for punching out the cups formed in this manner against the cutting plate 114.

For complete moulding of the cups, compressed air or moulding air is supplied to the cavity 166 via ventilation channels 140 (so-called ventilation phase of the thermoforming mould 100), so that the pre-shaped plastic film is pressed against the mould insert 162 and mould bottom 164. Once the moulding process has concluded, the cavity is deaerated (so-called deaeration phase) and the two mould parts 110, 150 are moved out of one another in order to eject the moulded cups and initiate a new moulding process.

When performing the moulding process it is important that the upper mould part 110 and the lower mould part 150 are aligned as parallel to one another as possible. If the mould parts 110, 150 deviate from a parallel alignment, this is called a tilting of the mould parts 110, 150 with respect to one another. FIG. 1b illustrates the thermoforming mould according to FIG. 1a, wherein the upper mould part 110 has a tilting with respect to the lower mould part 150. The degree (that is, the magnitude or severity) of the tilting can be determined according to a tilt angle $\alpha$ between the mould parts 110, 150. The larger the tilt angle $\alpha$, the more negative the resulting effects on the thermoforming mould 100 and/or moulding process. Thus, for example, a tilting of the mould parts 110, 150 can have negative effects on the quality of the cups to be produced. Furthermore, a tilting of the mould parts 110, 150 can lead to elevated wear on the mould 100 (e.g., due to metal contact between cutting edge 115 and cutting plate 114).

To prevent a tilting, the prior art provides a parallelity measurement (or tilting measurement) of the mould parts 110, 150 following the installation of the thermoforming mould in a thermoforming machine and prior to start-up of the latter. Essentially five work steps are required for the measurement, and these are explained in greater detail in the following in connection with FIGS. 2a and 2b.

FIG. 2a illustrates a thermoforming mould 200. Corresponding to the thermoforming mould 100 according to FIGS. 1a and 1b, the thermoforming mould comprises an upper mould part 210 and a lower mould part 250. The thermoforming mould 200 is essentially rectangular in shape. FIG. 2b illustrates a sectional excerpt at a first corner 220 of the thermoforming mould 200 illustrated in FIG. 2a.

To measure the tilting of the mould parts 210, 250 with respect to one another, in a first work step a user uses a mechanical dial gauge 230 to measure the distance between the mould parts 210, 250 at the first corner 220 of the thermoforming mould 200. As illustrated in FIG. 2b, the dial gauge 230 is positioned on a measuring surface 252 of the lower mould part 250 and a spring-loaded measuring rod 235 of the dial gauge 230 is brought into contact with a measuring surface 212 of the upper mould part 210. In a second work step, the measured distance between the mould parts 210, 250 is found and zeroized as the reference difference. In a third work step, the user measures the distances between the mould parts 210, 250 in at least two further corners of the thermoforming mould 200. In a fourth work step, the deviations of the measured distances from the first-measured reference value is determined, and, in a fifth work step, a value for the tilting of the mould parts 210, 250 $f$ with respect to one another is calculated. If this values exceeds a pre-specified critical limit, the position of the mould parts 210, 250 with respect to one another must be corrected prior to starting up the thermoforming machine.

One drawback of this manual measuring method is that the tilting of the mould parts 210, 250 can only be determined when the machine is not running (that is, prior to starting up). The tilting of the mould parts 210, 250 cannot be monitored while the thermoforming machine is operating. Therefore, if the position of the mould parts 210, 250 with respect to one another changes while the machine is operating (for example due to an external force), it is not possible to react, since the change is not detected. In addition, the measuring method described in the foregoing is time-intensive.

The object of the present invention is to improve the measurement of the tilting between mould parts of thermoforming moulds. In particular, the present invention is intended to provide an opportunity to perform a tilting measurement of mould parts of a thermoforming mould, even during the thermoforming process. Furthermore, the speed of the tilting measurement is to be increased.

SUMMARY

To attain the underlying object of the invention, a thermoforming mould for producing cup-shaped articles from a heated film of plastic is provided. The thermoforming mould comprises a first mould part and a second mould part, which are movable in relation to one another, wherein at least one cavity for moulding a cup-shaped article is formed in one of the two mould parts. The thermoforming mould also comprises a measuring device which is designed to determine a tilting of the first mould part and the second mould part with respect to one another.

The measuring device can be designed to determine the tilting of the two mould parts with respect to one another when the thermoforming mould is not running and/or when the thermoforming mould is operating (in real time).

The first mould part can be an upper mould part and the second mould part can be a lower mould part of the thermoforming mould. The first mould part can be installed rigid in a thermoforming machine (i.e., borne fixed with respect to a frame of the thermoforming machine). The second mould part can be arranged movable in the thermoforming machine. The cavity for forming the cup-shaped article can be embodied in the second mould part. "Cup-shaped article" can refer to a cup and/or a lid.

The measuring device of the thermoforming mould can comprise at least one sensor, wherein the at least one sensor is arranged on one of the two mould parts and is designed to record at least one measured value that indicates a tilting of the first mould part and the second mould part with respect to one another. In particular the at least one sensor can be securely mounted to one of the two mould parts. Thus the at least one sensor can be permanently attached (that is, even during a thermoforming process) in one of the two mould parts.

According to one variant, the thermoforming mould can comprise a single sensor. The one sensor can be designed to record a measured value that indicates directly (i.e. without additional sensor data from another sensor) a tilting of the two mould parts with respect to one another. The one sensor can be implemented in the form of a 3D scanner.

According to one alternative variant, the measuring device can comprise at least two sensors arranged spaced apart from one another. In particular, the measuring device can comprise at least three sensors arranged spaced apart from one another. The at least two or at least three sensors can be designed to measure a distance between the first mould part and the second mould part at measuring points that are different from one another. The different measuring points can each be disposed in different corner regions of the thermoforming mould.

Each of the at least one sensors can be arranged on the same mould part. In particular, each of the at least one sensors can be arranged on the first mould part. The arrangement of the sensor/sensors in the first mould part can be advantageous in particular when the first mould part in a thermoforming machine is borne stationary in a thermoforming machine. In this way, the risk of vibrations interfering with the sensor or sensors can be reduced. Furthermore, the at least one sensor can be wired. If the sensor is wired, complex arrangement of the wiring can be avoided by arranging the at least one sensor on the fixed first mould part.

The measuring device can furthermore comprise at least one reference element associated with the at least one sensor. The at least one reference element can be arranged on the mould part opposing the specific sensor. The at least one sensor can be designed to record the at least one measured value for the at least one reference element.

The at least one reference element can be securely mounted on the corresponding mould part. A surface segment of the corresponding mould part on which the reference element is arranged can function as the reference element. Alternatively, the reference element can be a metal object that is (securely) mounted on or in the corresponding mould part and that acts as reference for the distance measurement by means of an inductive sensor. According to another alternative variant, the reference element can be a mirror or reflecting surface if the at least one sensor is an optical sensor. According to a further alternative variant, the reference element can be any reference object that corresponds to a specific type of sensor, so that at least one measured value that indicates a tilting of the mould parts with respect to one another can be recorded by the at least one corresponding sensor.

According to one preferred variant, the measuring devices can comprise at least two sensors and at least two reference elements. Each of the at least two sensors can be designed to measure a distance to the reference element with which it is associated. The at least two sensors can preferably be arranged spaced apart from one another on the corresponding mould part. The measuring device can furthermore be designed to calculate the tilting of the mould parts with respect to one another from the distances of the at least two sensors to one another and the distances of the sensors to the corresponding reference elements.

Alternatively to a distance value, the measured value can be a value that directly indicates the position (and thus also the tilting) of the mould parts with respect to one another. Such a value can be recorded using a surface scan of a 3D sensor (3D scanner).

Each of the at least one sensors (or each of the at least two sensors) can be an inductive, capacitive, or optical sensor. Alternatively, the at least one sensor can be a 3D scanner (i.e. a camera), a mechanical sensor (e.g. with a spring-loaded measuring rod), a sound sensor, an eddy current sensor, a magneto-resistive sensor, a piezo-electric sensor, or a pressure sensor. For example, the measuring device can comprise at least two sensors, wherein each of the sensors is a pressure sensor that is designed to measure a pressure in cylindrical spaces. The pressure in the cylindrical spaces arises due to the actuation of hydraulics to move at least one of the mould parts. The different pressures in the cylinders at different corners of the thermoforming mould can permit conclusions to be drawn about the tilting of the mould parts.

Each of the at least one sensors can furthermore be designed to measure further process parameters, in addition to being designed for measuring measured values indicating a tilting. For example, at least one of the sensors can be designed to record additional measured values that indicate an output rate of the moulding process and/or a cutting depth of a cutting edge of the thermoforming mould. Alternatively, the measured values that indicate a tilting can be recorded and read out continuously over time. An output rate of the forming process can be determined indirectly from these measured values read out continuously. The output rate of the moulding process can be determined, for example, using the speed of the stroke cycles of cylinders that move the two mould parts towards and away from one another. A cutting depth of the cutting edge can be derived, for example, from a stroke path of the cylinder.

The measuring device of the thermoforming mould can comprise an evaluation device that is designed to determine the tilting of the two mould parts with respect to one another using the at least one measured value. The evaluation device can comprise at least one processor that is designed to process the measured values provided by the at least one sensor. The tilting can be described using a numerical value (e.g. a distance value or a degree value). According to one variant, the tilting can be described in particular by a deviation in the distance between the mould parts at a first location of the thermoforming mould from the distance between the mould parts at another location of the mould. In this case, the evaluation unit can be designed to determine that there is a critical tilting of the two mould parts if the distance deviation reaches or exceeds a pre-specified critical value. According to one alternative variant, the tilting can be described by the provision of a tilt angle $\alpha$ (or the magnitude of the tilt angle $\alpha$) between the first mould part and the second mould part. In this case the evaluation device can be designed to compare the tilt angle $\alpha$ to a pre-specified critical tilt angle $\alpha_{krit}$. The evaluation device can be designed to determine that there is a critical tilting of the two mould parts when the tilt angle $\alpha$ is equal to or greater than the critical tilt angle $\alpha_{krit}$. The critical tilt angle $\alpha_{krit}$ can be $0.1°$.

The thermoforming mould can comprise an optical or acoustic output device that is connected to the measuring device. The output device can be designed to output an optical or acoustic warning signal when the evaluation device of the measuring device has determined that there is a critical tilting of the mould parts. The output device can comprise a siren that outputs a warning signal when a critical tilting of the mould parts has been determined. Alternatively or in addition, the output device can comprise a warning lamp that outputs a warning light when a critical tilting of the mould parts has been determined. Furthermore, if a critical tilting has been determined, the thermoforming machine in which the thermoforming mould is installed can be switched off in order to correct the relative positions of the mould parts.

The measuring device of the thermoforming mould can comprise a communication interface in order to enable a data transfer between the measuring device and a user end device. The user end device can be a stationary or portable personal computer (PC). Alternatively, the user end device can be a tablet, smartphone, or even another device that is suitable for displaying the measured data. The measurement data from the sensors can be transmitted continuously or at pre-specified time intervals to the user via the communication interface. The user can then decide whether the positioning of the mould parts with respect to one another should be corrected or not.

Furthermore, for attaining the object underlying the invention, a thermoforming machine is provided for producing cup-shaped articles from a heated film of plastic. The thermoforming machine comprises the thermoforming mould according to one of the variants described in the foregoing. The thermoforming machine can furthermore comprise a control unit for controlling the measuring device. The control device can be disposed on the thermoforming machine. Alternatively, the control device can be implemented as an external control device (e.g., as an external computer).

The control device can comprise an input device. A user can transmit control commands to the measuring device via the input device. The input device can be a user end device, such as a PC, a tablet, or a smartphone, for example. The control device can be designed to transmit commands for establishing the critical tilting (e.g. the critical tilt angle $\alpha_{krit}$) to the measuring device of the thermoforming mould. In particular, the critical tilting or a value for the critical tilting (e.g. the critical tilt angle $\alpha_{krit}$) can be adjusted depending on the implementation of the thermoforming machine and/or the thermoforming mould (e.g. in a range of $0.001° \leq \alpha krit \leq 0.1°$).

Furthermore, for attaining the object underlying the invention, a method is provided for determining a tilting between a first and a second mould part of a thermoforming mould. The method comprises the following method steps: Providing a measuring device on the thermoforming mould; recording, by means of the measuring device, at least one measured value that indicates the tilting between the first mould part and the second mould part; and, Determining, based on the at least one recorded measured value of the measuring device, the tilting (i.e., a value indicating the tilting) of the two mould parts with respect to one another.

The method can be implemented by means of a thermoforming mould according to any of the aforesaid variants.

The step of providing the measuring device can comprise attaching at least one sensor to one of the mould parts. In particular, the step of providing the measuring device can comprise securely mounting the at least one sensor to one of the mould parts. The secure mounting can lead to permanent bearing of the at least one sensor in the relevant mould part of the two mould parts. Furthermore, the step of providing the measuring device can comprise attaching at least one reference element to the mould part opposing the specific sensor. Attaching the at least one reference element can comprise securely mounting the reference element to the specific mould part.

The step of recording the at least one measured value can occur for the at least one reference element that is arranged on the mould part opposing the specific sensor. Furthermore, the step of recording the at least one measured value can take place in an inductive, capacitive, or optical manner. According to one alternative variant, the step of recording the at least one measured value can take place by means of a surface recording (3D scan with a camera), mechanically, by means of sound waves, by means of eddy current, magneto-resistively, piezoelectrically, or by means of pressure sensing.

The step of determining the tilting can comprise comparing at least two measured values that were provided by the measuring device. The at least two measured values can preferably originate from sensors arranged spaced apart from one another on the thermoforming mould. For example, the step of determining the tilting can comprise calculating a deviation between the at least two measured values. Alternatively or in addition, the step of determining the tilting can comprise calculating a tilt angle $\alpha$ between the mould parts.

The method can furthermore comprise at least one of the following method steps: Comparing the tilting (e.g. the calculated tilt angle α) to a pre-specified critical tilting (e.g. to a critical tilt angle $α_{krit}$); Transmitting the calculated tilting (e.g. the tilt angle α) to an end user device; Outputting an optical or acoustic warning signal if the calculated tilting (e.g. of the calculated tilt angle α) is greater than or equal to the critical tilting (e.g. the critical tilt angle $α_{krit}$); and stopping the operation of the thermoforming machine in which the thermoforming mould is installed if the calculated tilting (e.g. the calculated tilt angle α) is greater than or equal to the critical tilting (e.g. the critical tilt angle $α_{krit}$).

The method for determining the tilting between the first and the second mould part of the thermoforming mould can be carried out while the thermoforming mould is not running and/or during its operation (i.e., during the moulding process). According to one variant, the tilting of the mould parts can be measured continuously during each moulding or stamping cycle.

Measuring the tilting during the production process offers significant advantages over the manual method of measuring according to the prior art described in the foregoing.

Further details and advantages of the invention shall be explained in greater detail using drawings.

DETAILED DESCRIPTION OF THE DRAWINGS

FIGS. 1a, 1b, 2a and 2b were already described in connection with the prior art. Refer to that portion of the description. A thermoforming mould according to the present invention shall be described in greater detail in the following using FIG. 3.

Figure 3:
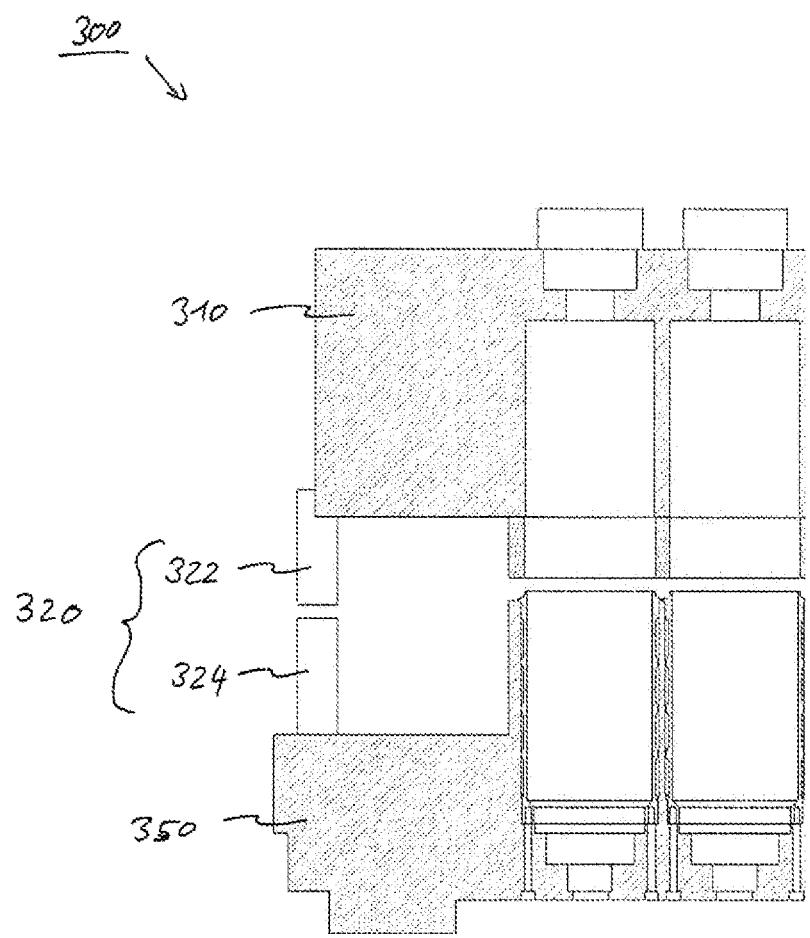
FIG. 3 is a schematic sectional depiction of an excerpt of a thermoforming mould according to the present invention; and, FIG. 4 is a flow chart for depicting a method for determining a tilting of two mould parts of a thermoforming mould according to the present invention.

FIG. 3 depicts an excerpt of a thermoforming mould 300, in cross-section, for producing cup-shaped articles from a heated film of plastic. The thermoforming mould 300 comprises a first mould part 310 and a second mould part 350. According to the illustration in FIG. 3, the first mould part 310 is an upper mould part and the second mould part 350 is a lower mould part of the thermoforming mould 300. The mould parts 310, 350 are arranged movable in relation to one another. According to the illustration in FIG. 3, a plurality of cavities, each for forming a cup-shaped article, are embodied in the second mould part 350. The first mould part 310 and the second mould part 350 can have some or all of the features of the upper mould part 110 or lower mould part 150 of the thermoforming mould 100 described in connection with FIGS. 1a and 1b. Refer to the description of FIG. 1a for a more detailed description of these features.

Figure 1A:
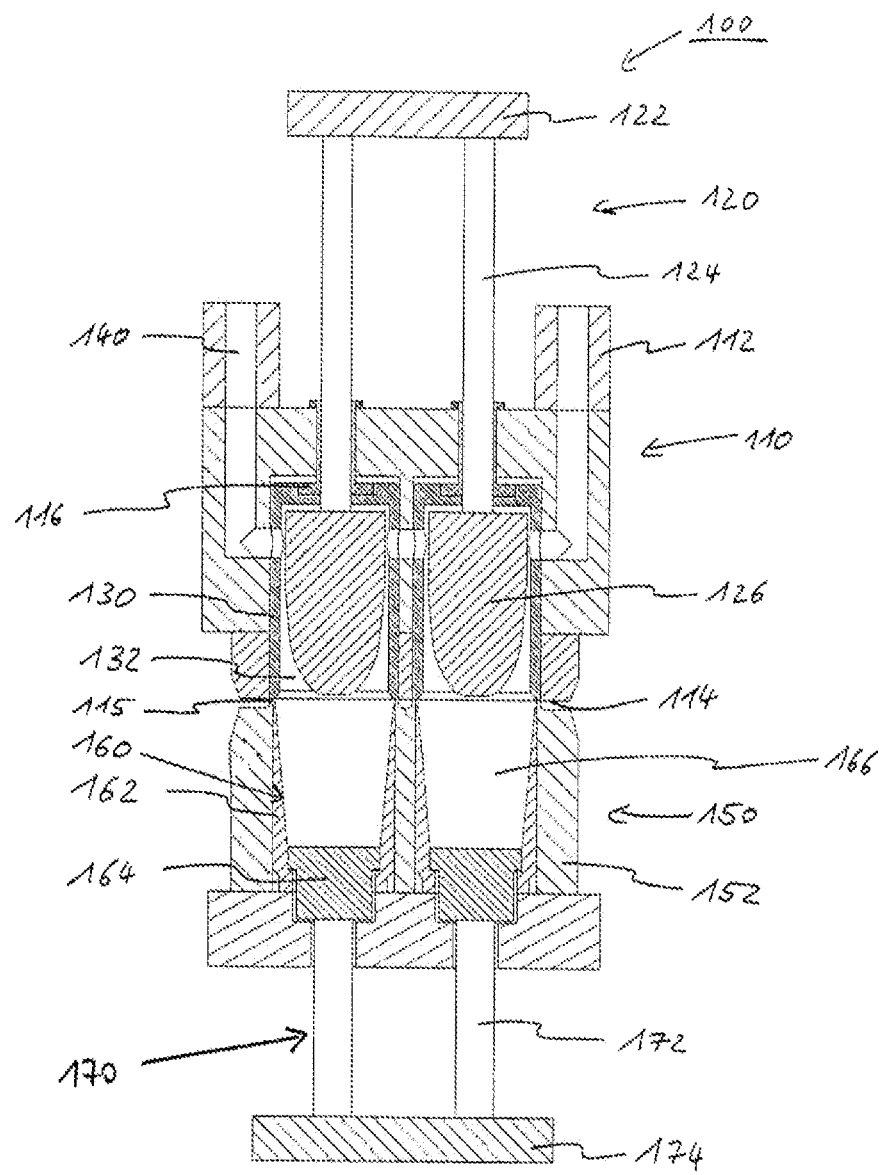
FIG. 1a is a sectional view of a thermoforming mould according to the prior art.
Figure 1B:
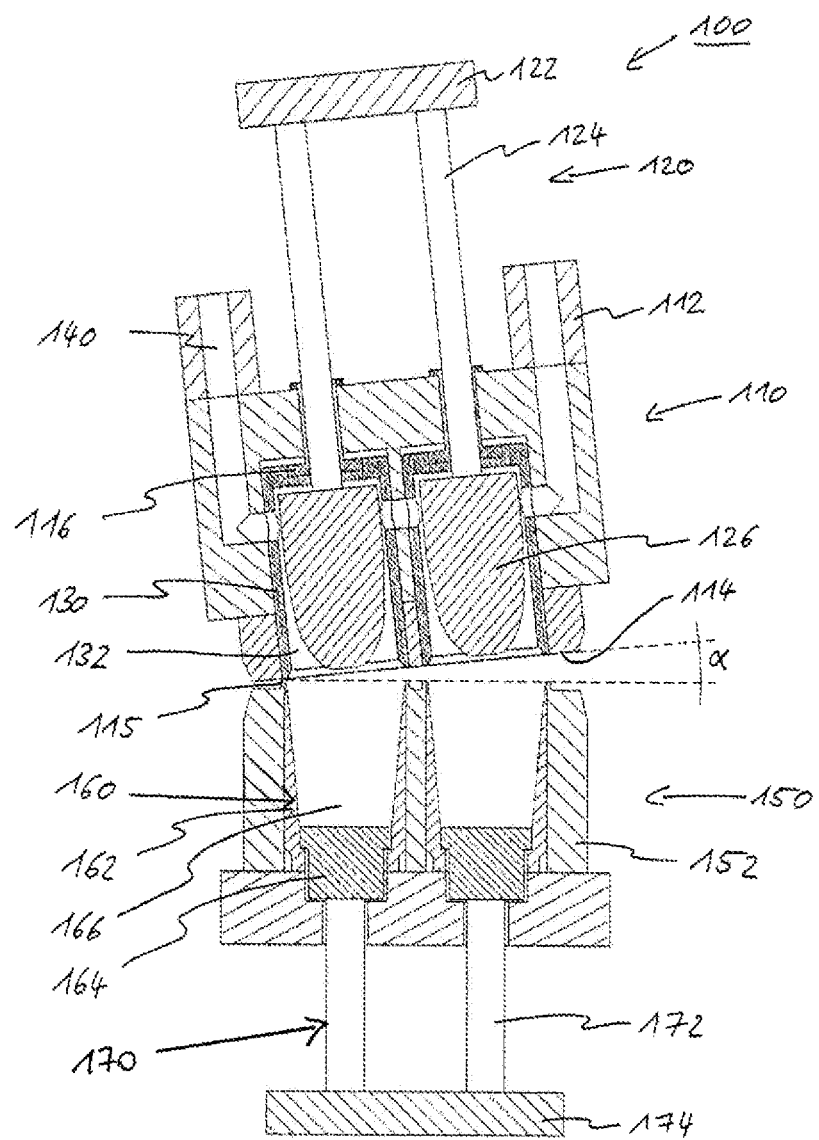
FIG. 1b is a sectional view of the thermoforming mould according to FIG. 1a, wherein the upper and the lower mould part have a tilting with respect to one another.
Figure 2A:
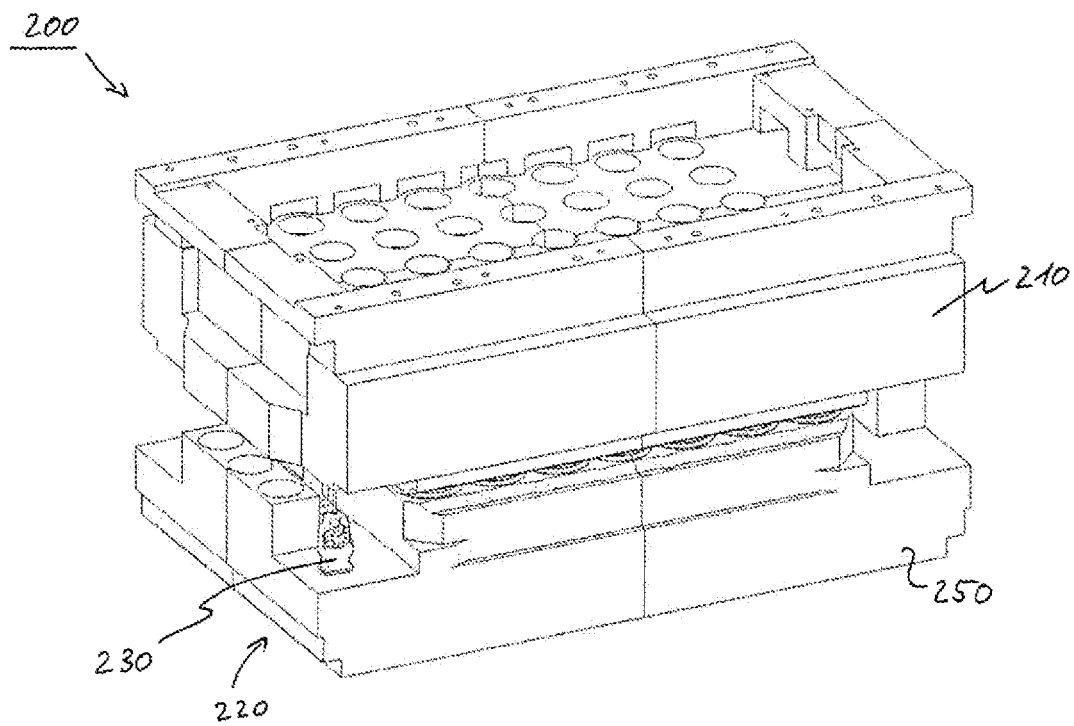
FIG. 2a is a further thermoforming mould with an external dial gauge for the tilting measurement according to the prior art.
Figure 2B:
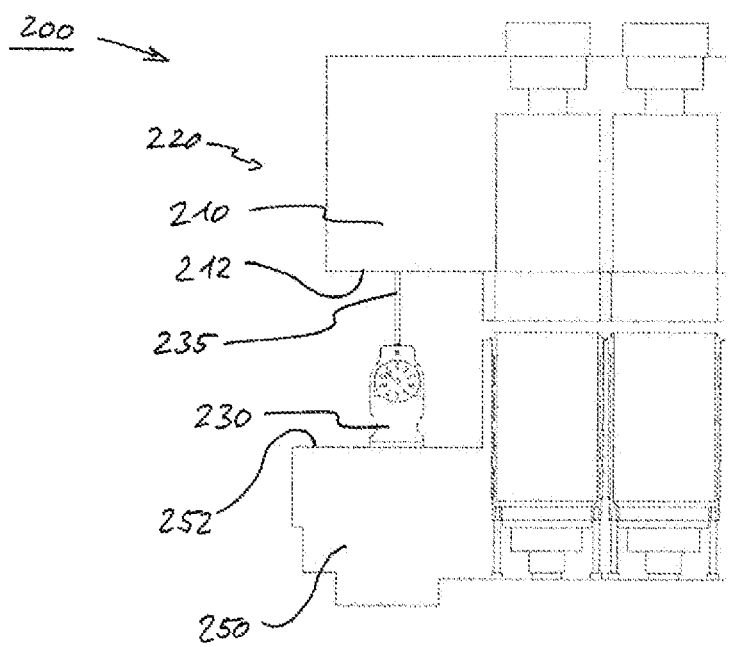
FIG. 2b is a sectional view of an excerpt from the thermoforming mould illustrated in FIG. 2a for clarifying the measurement method according to the prior art.

In contrast to the thermoforming mould 100 in FIGS. 1a and 1b, the thermoforming mould 300 comprises a measuring device 320. The measuring device 320 is designed to determine a tilting of the first mould part 310 and the second mould part 350 with respect to one another. The measuring device 320 comprises at least one sensor 322. The measuring device 320 furthermore comprises at least one reference element 324. According to one preferred variant, the measuring device 320 of the thermoforming mould 300 can comprise at least two sensors 322 spaced apart from one another and at least two reference elements 324, each corresponding to one of the sensors 322. Each of the sensors 322 can be designed to record a measured value for the at least one reference element 324 with which it is associated.

According to the illustration in FIG. 3, the at least one reference element 324 is arranged on the second mould part 350 and projects therefrom. Alternatively, the at least one reference element 324 can also be a surface or surface segment of the second mould part 350. According to a further alternative, the at least one reference element 324 can be any desired reference object that corresponds to a specific type of sensor so that, using the at least one corresponding sensor 322, at least one measured value can be recorded that indicates a tilting of the mould parts 310, 350 with respect to one another.

The measured value can be a distance between the at least one sensor 322 and the reference element 324 corresponding to the sensor 322. Alternatively, the measured value can be a value that directly indicates the position of the mould parts 310, 350 with respect to one another. Such a value can be recorded using a surface scan of a 3D sensor (3D scanner).

The at least one sensor 322 can be an inductive, capacitive, or optical sensor. Correspondingly, the measured value can be a capacitive value, inductivity value, or run time value (for the optical measurement) that is proportional to the distance to be measured. Alternatively, the at least one sensor can be a 3D scanner (i.e., a camera), a mechanical sensor (e.g. with a spring-loaded measuring rod), a sound sensor, an eddy current sensor, a magneto-resistive sensor, a piezoelectric sensor, or a pressure sensor.

The at least one sensor 322 is designed to record measured values that can be used by an evaluation device (not shown in FIG. 3) of the measuring device 320 to determine a tilting of the two mould parts 310, 350 with respect to one another. The evaluation device can comprise at least one processor (also not shown in FIG. 3) that is designed to process the measured values provided by the at least one sensor.

The thermoforming mould can comprise an optical or acoustic output device (not shown in FIG. 3) that is connected to the measuring device. The output device can be designed to output an optical or acoustic warning signal when a critical tilting of the mould parts has been determined by the evaluation device of the measuring device.

The measuring device 320 can furthermore be designed to communicate with a user end device (for example, a PC, tablet, or smartphone) via a communication interface. The measuring device 320 can receive commands from a user via the end user device. Likewise, the recorded measured values and/or the determined tilting (e.g. the tilt angle α) can be called up by the measuring device 320 via the communication interface and transmitted (e.g. visually) on the end user device.

Figure 4:
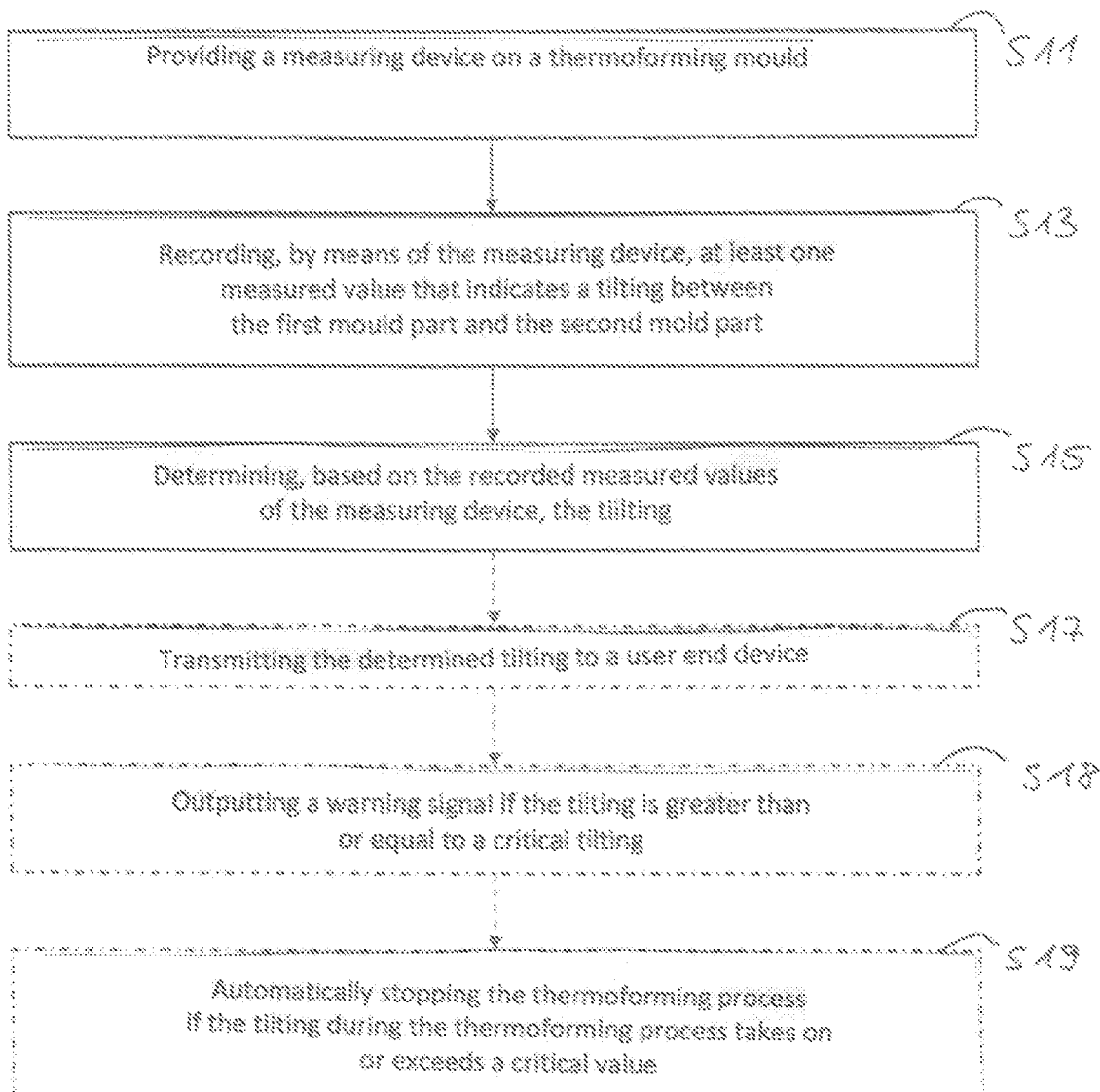

In connection with FIG. 4, the following describes in greater detail a method 10 for determining a tilting between a first and a second mould part of a thermoforming mould according to the present invention.

In a first step S11, the method 10 comprises providing the measuring device described above on a thermoforming mould. The step S11 of providing the measuring device can comprise attaching at least one sensor to one of the mould parts. In particular, the step of providing the measuring device can comprise mounting the at least one sensor securely to one of the two mould parts. Furthermore, the step S11 of providing the measuring device can comprise (securely) attaching at least one reference element to the mould part opposing the specific sensor.

In a second step S13, the method 10 comprises recording, by means of the measuring device, at least one measured value, wherein the at least one measured value indicates the tilting between the first mould part and the second mould part. The step S13 of recording the at least one measured value can occur with respect to the at least one reference element. Furthermore, the step S13 of recording the at least one measured value can take place in an inductive, capacitive, or optical manner (or, as described briefly in the forgoing, using other types of measurements).

In a third step S15, the method 10 comprises determining a tilting based on the at least one recorded measured value of the measuring device. Determining the tilting can comprise comparing at least two measured values that have been provided by the measuring device. The at least two measured values can preferably come from different sensors. The step of determining the tilting can furthermore comprise calculating a tilt angle $\alpha$ between the mould parts.

The method 10 can also comprise further optional method steps S17, S18, and/or 519 in this or another sequence.

The optional method step S17 can comprise transmitting the determined tilting (e.g. of the calculated tilt angle $\alpha$) to a user end device. The transmitting can take place continuously during the thermoforming process. Continuous transmission of the determined tilting can inform a user about the tilting of the mould parts at any time (e.g. via the magnitude of the tilting).

According to the method step S18, the method 10 can furthermore comprise outputting a warning signal if the determined tilting (e.g. the tilt angle $\alpha$) is greater than or equal to a critical tilting (e.g. a critical tilt angle $\alpha_{krit}$). The warning signal can comprise an optical and/or acoustic signal.

According to the method step S19, the method 10 can furthermore comprise automatically stopping the thermoforming process if the determined tilting during the thermoforming process reaches or exceeds a critical value. In particular, the machine operation can be stopped automatically if the calculated tilt angle $\alpha$ is greater than or equal to the critical tilt angle=$\alpha_{krit}$. Stopping the thermoforming process can comprise turning off the thermoforming machine in which the thermoforming mould is installed.

It is understood that the method for determining the tilting between the first and second mould part of the thermoforming mould can also be performed when the thermoforming machine in which the thermoforming mould is installed is not running.

With the inventive technology, it is possible to detect, rapidly (and precisely), tiltings of mould parts installed in thermoforming machines. Since the measuring device is permanently mounted in the thermoforming mould, the alignment of the thermoforming moulds with respect to one another can be checked even when the thermoforming machine is operating (i.e., during the thermoforming process). Thus continuous monitoring of the mould parts is possible for the first time. Due to the continuous monitoring, critical tiltings of the mould parts with respect to one another can be detected and eliminated early, so that overall wear on the mould parts is reduced.

What is claimed is:

1. A thermoforming mould assembly configured to be installed in a thermoforming machine for producing cup-shaped articles from a heated film of plastic comprising a first mould part and a second mould part, which are movable in relation to one another, wherein at least one cavity for moulding a cup-shaped article is formed in one of the two mould parts, wherein the thermoforming mould comprises a measuring device which is designed to determine a tilting of the first mould part and the second mould part with respect to one another, wherein the measuring device comprises:
   at least two sensors, wherein the at least two sensors are arranged spaced apart from one another on one of the two mould parts; and
   at least two reference elements associated with the at least two sensors and arranged on the other one of the two mould parts and opposite to the at least two sensors, wherein each of the at least two sensors is designed to measure a distance to the reference element with which it is associated,
   wherein the measuring device further comprises an evaluation device designed to determine the tilting of the two mould parts with respect to one another by comparing the measured distances of the at least two sensors to the corresponding reference elements.

2. The thermoforming mould assembly according to claim 1, wherein the at least two sensors comprise an inductive, capacitive, or optical sensor.

3. The thermoforming mould assembly according to claim 1, wherein the thermoforming mould furthermore comprises an optical or acoustic output device that is connected to the measuring device and that is designed to output an optical or acoustic warning signal if the determined tilting exceeds a prespecified limit.

4. The thermoforming mould assembly according to claim 1, wherein the measuring device furthermore comprises a communication interface in order to enable a data transfer between the measuring device and a user end device.

5. A thermoforming machine for producing cup-shaped articles from a heated film of plastic, comprising:
   the thermoforming mould assembly according to claim 1.

6. A method for determining a tilting between a first mould part and a second mould part of a thermoforming mould assembly installed in a thermoforming machine, the method comprising the following steps:
   providing a measuring device on the thermoforming mould, wherein the step of providing the measuring device comprises arranging at least two sensors spaced apart from one another on one of the two mould parts, and providing at least two reference elements associated with respective ones of the at least two sensors on the other one of the two mould parts;
   measuring, by means of each of the at least two sensors of the measuring device, a distance to the reference element with which each sensor is associated; and
   determining the tilting of the two mould parts with respect to one another by comparing the measured distances of the at least two sensors to the corresponding reference elements.

7. The method according to claim 6, wherein the step of measuring the distance takes place in an inductive, capacitive, or optical manner.

8. The method according to claim 6, wherein the method is carried out while the thermoforming mould is stopped and/or during its operation.

\* \* \* \* \*